United States Patent [19]

Filderman

[11] 4,135,410
[45] Jan. 23, 1979

[54] INERTIAL LOCKING DEVICE

[75] Inventor: René G. Filderman, Asnieres, France

[73] Assignee: Societe Anonyme Francaise du Ferdo, Paris, France

[21] Appl. No.: 821,356

[22] Filed: Aug. 3, 1977

[30] Foreign Application Priority Data

Aug. 10, 1976 [FR] France ............................. 76 24397
Dec. 27, 1976 [FR] France ............................. 76 39181

[51] Int. Cl.² ........................................... F16H 57/10
[52] U.S. Cl. ................................... 74/411.5; 280/744
[58] Field of Search ..................... 74/64, 577 S, 411.5; 280/744, 746

[56] References Cited

U.S. PATENT DOCUMENTS 3,749,871 7/1973 Stoll et al. .................... 74/577 SF X
4,084,840 4/1978 Buff ..................................... 280/744

Primary Examiner—Leonard H. Gerin
Attorney, Agent, or Firm—Bacon & Thomas

[57] ABSTRACT

An inertial locking device for blocking the rotation of a shaft. The device comprises a pivoting ratchet which is brought into contact with a gear means to prevent further rotation of the shaft by virtue of the displacement of an inertial mass within the device. The device may be used in conjunction with a seat belt retractor so as to prevent further extraction of the belt in the event the retractor is subjected to a destabilizing force.

14 Claims, 4 Drawing Figures

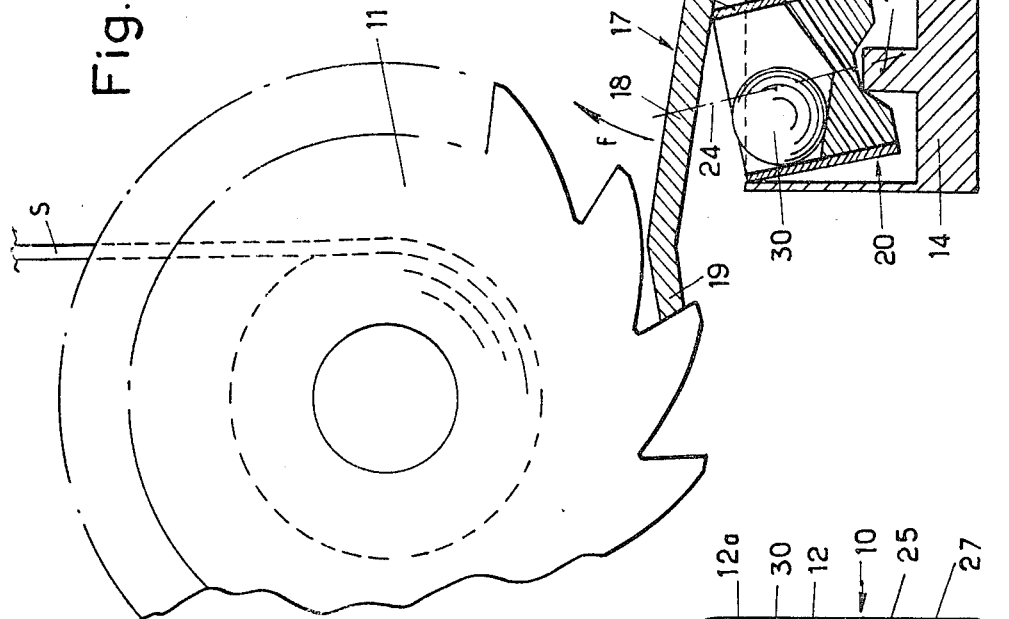
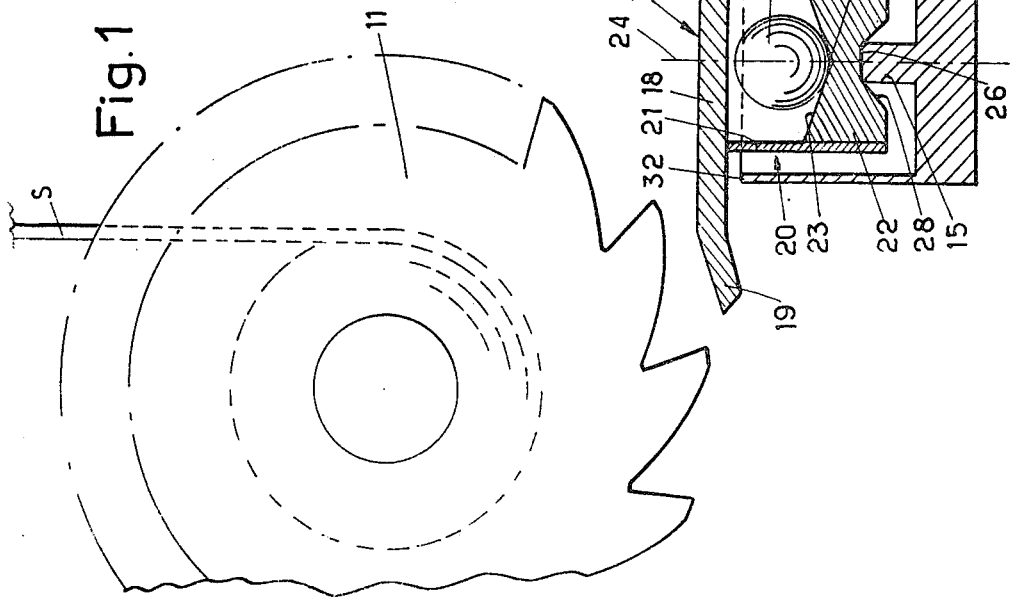

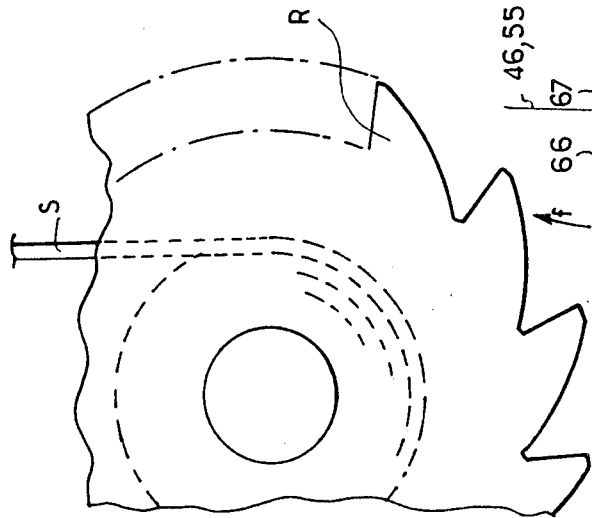
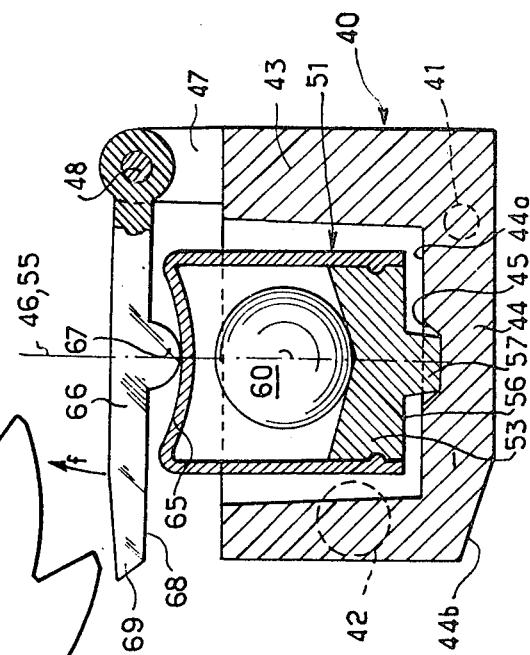
Fig. 3
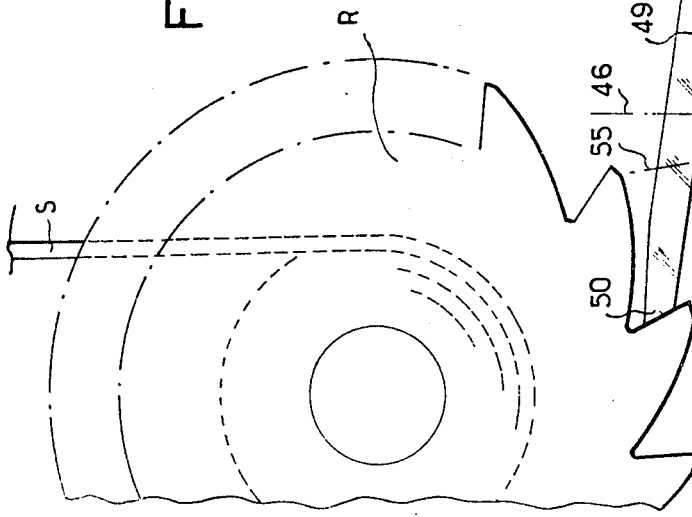
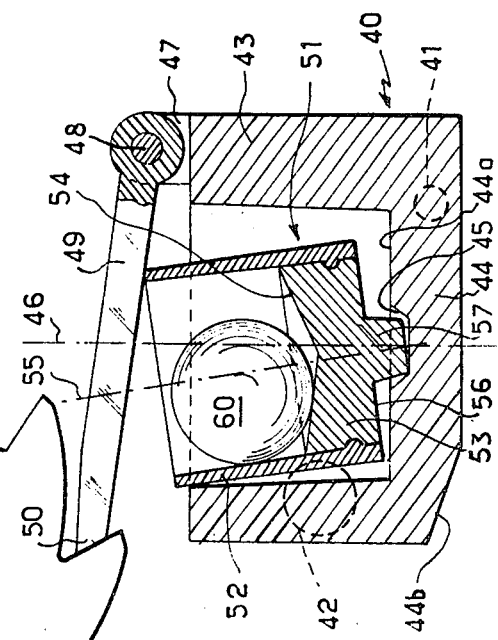
Fig. 4

INERTIAL LOCKING DEVICE

BACKGROUND OF THE INVENTION

1. Field of the Invention

The invention relates to an inertia sensitive device for use in controlling the revolution of a shaft such as that of a seat belt retractor.

2. Description of the Prior Art

Known retractors for the safety belts of vehicles comprise a device for controlling the locking of the retractor in the direction of rotation corresponding to the extraction of the strap of the belt. The devices become activated when the vehicle is subjected to a predetermined value of acceleration or deceleration. The device is arranged such that it also becomes activated to prevent the extraction of the strap when the vehicle turns over or is tilted over. The blockage of the retractor is generally caused by means of a lever or other pivoting element which acts as a ratchet adapted to cooperate with the teeth of a wheel or gear directly or indirectly connected to the shaft of the retractor. The movement of the ratchet is generally controlled by the displacement of an inertia mass (ball or pendulum) which cooperates with the ratchet.

As a result of the construction of the known devices, the threshold of the triggering of the locking of the retractor varies according to the direction of the acceleration or deceleration or further on the angle of tilt to which the device responds. In effect, the inertia mass (ball, pendulum or the like) cooperates directly with the ratchet at variable distances from its pivoting axis thus corresponding to different trigger thresholds. Numerous inconveniences are therefore encountered due to the fact that, if it is desired that the devices trigger at low responses thresholds, it is also necessary that the triggering take place for a value of the angle of inclination or for a value of acceleration or of deceleration independant of the direction.

SUMMARY OF THE INVENTION

It is, in a general fashion, an object of the invention to furnish devices which obviate the inconveniences, cited hereinabove, of the known devices.

It is equally an aim of the invention to provide locking devices which are of simple construction and of increased reliability.

The inertia device according to the invention, which may in particular be used for controlling the locking of a retractor of a strap or the like, comprises a pivoting ratchet adapted to cooperate with the teeth of a gear means or wheel directly or indirectly attached to the shaft of the retractor. The ratchet is rendered operational to lock the retractor by the displacement of an inertia mass. The said mass is lodged in a holder mounted to rock in a container and whose position depends on that of the center of gravity of the inertia mass. The ratchet supports the ratchet in a rest position of the device and is arranged to cause the pivoting of the ratchet when the inertia mass is displaced by being subjected to the action of its own weight.

In a preferred embodiment, the inertia mass is a ball made out of a material of high density and the bottom of the holder on which the ball rests has a conical surface.

The outer surface of the bottom of the holder is in an advantageous fashion shaped to provide a supporting zone for the holder on a projection connected to the container of the device. The rocking of the ratchet which rests on the section of the side wall of the holder occurs as soon as the device is subjected to an acceleration, a deceleration of a tilting which makes the inertia mass move a sufficient distance such that the center of gravity of the holder-inertia mass combination is no longer aligned with the plumb line of the projection.

To improve the operating characteristics of such a device, especially with respect to the equilibrium conditions of the holder and, consequently, the triggering conditions of the lock, the present invention provides for shaping the bottom of the inner surface of the container into a socket and the outer surface of the base of the holder into a heel which may be partially lodged in the said socket. The dimensions and the shape of the latter as well as those of the heel are such that, during a displacement of the inertia mass, the holder rocks around one edge of the heel cooperating with the bottom of the socket.

According to another feature of the invention, the container is blocked or covered opposite to its base having the heel by a wall with which a projection of the pivoting ratchet is arranged to cooperate. The arrangement is such that a rocking of the container also causes a displacement of the ratchet, irrespective of the direction of the rocking.

The inertia mass never being in contact in the condition of rest of the device, the threshold of sensitivity is determined solely by the angle of the summit of the conical surface with which the inertia mass cooperates.

The sensitivity of the device is thus independant of the direction of the acceleration, of the deceleration or of the tilting.

BRIEF DESCRIPTION OF THE DRAWINGS

Other characteristics and advantages of the invention will become apparent from the description which follows, done by way of example and in reference to the attached drawings, in which:

FIG. 1 is a cross-sectional view, in the position of rest, of a first embodiment of an inertia device according to the invention associated with a toothed wheel or gear of a strap retractor or the like;

FIG. 2 is a view analogous to that of FIG. 1 but for an activated position of the device;

FIG. 3 is a schematic view, in cross-section, of a device according to a second embodiment of the invention;

FIG. 4 is a schematic view, in cross-section, of a device according to a third embodiment of the invention.

DESCRIPTION OF THE INVENTION

A first inertia device according to the invention, for controlling the locking of a strap retractor, in particular the strap of a seat belt for an automobile vehicle is shown in FIGS. 1 and 2. It comprises a container 10 adapted to be connected with the frame of a retractor. The end of a strap S is attached to a shaft in the retractor. A toothed wheel 11 is attached, directly or indirectly, to the retractor shaft. The side wall 12 of the container 10 defines an opening 13. The container is closed by a bottom 14 having a projection 15 which projects into the container. On a protrusion 12a of the free end of the wall 12 is pivotably mounted a ratchet 17 comprising an arm 18 whose length is greater than the dimension of the opening 13 of the container and which terminates in a finger 19 slightly inclined with respect to the longitudinal direction of the arm. By virtue of the presence of the protrusion 12a, the pivoting axis 16 of the ratchet 17 is at a distance from the bottom 14 greater than the spacing of the edge 32 of the part of the wall 12 opposite to the protrusion 12a.

The container 10 contains a holder 20, of very low weight, advantageously made out of plastic material and which is constituted by the assembly of a cylindrical side wall 21, of low thickness with a bottom 22. The inside of the container has a conical surface 23 of axis 24 and an apex 25 while its outer surface has at the center of the apex 25 a flat region 26 of dimensions matching those of the projection 15. The flat region connects to an annular planar zone 27 by a frustroconical portion 28 of height less than that of the projection 15.

In the holder 20 is lodged a ball 30 made out of a material of high density, for example steel, whose diameter is such that, in the rest condition of the device, i.e., that in which the ratchet is not operational, the arm 18 is never in contact with the said ball. In this same condition of rest, the side wall of the holder 20 has a peripheral edge 31 which projects with respect to the edge 32 of the container 10, such that the arm 18 rests on the edge 31.

When, starting from this condition, the device is subjected to a destabilizing force such as an acceleration, a deceleration or a tilting, the inertia mass formed by the ball 30 is displaced with respect to its equilibrium position shown in FIG. 1. This displacement of the ball as it rolls on the inclined ramp which constitutes the internal conical surface 23 of the bottom 22 of the holder, up to the side wall 21, causes the center of gravity of the combination holder 20-ball 30 to displace itself and rock for example, towards the left of the axis 24, as shown in FIG. 2. When the center of gravity of the holder-ball combination is not plumb with the projection 15, the holder 20 rocks around the said projection thus pushing the ratchet 17 which pivots around the axis 16, as shown by the arrow f, to bring its tooth 19 into cooperation with the gear means or wheel 11 of the retractor thus locking it. By the term "gear means" is meant any means which may be cooperate with a ratchet such that the means becomes locked in the event the device is subjected to a destabilizing force.

The ball 30, by virtue of its own weight, moves from its position of rest as soon as a predetermined inertia force acts upon it, independently of the direction of the acceleration or of the deceleration or of the tilting which causes it, such that the rocking of the holder 20 always triggers the device at the same threshold value.

When, starting from the position described immediately hereinabove, the acceleration or the deceleration diminishes until it is inferior to the triggering threshold value, the ball 30 returns by rolling along the internal conical surface 23 towards the apex 25 of the said surface. This results in returning the holder-ball combination into its non-active or rest position.

The invention is not, it should be well understood, limited to the embodiment described and shown.

Thus, the inertia mass may be constituted by an element other than the ball 30, for example a pendulum whose displacement, by changing the center of gravity of the holder inertia-mass combination, causes the rocking of the holder and as a result the pivoting of the locking ratchet.

A second inertia device according to the invention, for controlling the lock of a strap retractor, in particular the strap of a safety belt of an automobile vehicle, is shown in FIG. 3. It comprises a container 40, adapted to be fixed on the retractor by the pins 41 and 42 fitted in the holes corresponding to the frame of the retractor. The frame comprises a rotatable shaft to which is connected, directly or indirectly, a toothed wheel R and on which the end of the strap S is attached. The container 40 is formed by a side wall 43 and a bottom 44 which has, at the center of its internal surface 44a, a frustroconical socket 45 of small depth, arranged around an axis 46 and which diverges in the direction of the internal face 44a. On its external face, the bottom 44 is bevelled on one of its edges as shown in 44b.

A protrusion 47 is located at the free end of the wall 43, i.e., the end opposite the bottom 44. A ratchet 50 is pivotably mounted, around a shaft 48. The end 50 of the ratchet spaced from the pivoting shaft is adapted to cooperate with the teeth of the gear or toothed wheel R.

In the container 40 is placed a holder 51, of very light weight, advantageously made out of plastic material, and which is formed by the assembly, for example by snapping together, of a cylindrical sleeve 52 with a bottom 53 having an internal frustroconical surface 54 of axis 55. The external surface of the bottom 53 comprises a planar annular zone 56 surrounding a frustroconical heel 57 whose axis is aligned with the axis 55 of the internal surface 54 of the said bottom and whose height is greater than the depth of the socket 45. The angle of the apex of the lateral surface of the heel being below the apex of the surface defining the socket.

The free end of the sleeve 52 — opposite to the bottom 53 — projects with respect to the edge of the side wall 43 of the container, while the heel 57, partially received in the socket 45, can be displaced with respect to the socket.

In the holder 51 is lodged a ball 60, made out of material having a high density, such as for example steel. The diameter of the ball is such that in the condition of rest of the device, i.e., that in which the ratchet 49 is not operational and in which the axes 55 and 46 are aligned, the ratchet 49 is never in contact with the ball, but rests instead on the edge of the free end of the sleeve 52.

When, starting from the condition of rest, the device is subjected to an acceleration, a deceleration, or a tilting force greater than a predetermined threshold value, the inertia mass formed by the ball 60 is displaced with respect to its equilibrium position. It thus rolls on the surface 54 of the bottom 53 of the container causing the center of gravity of the holder-ball combination to move so that it is no longer, as a result, aligned with the axes 55 and 46, initially aligned. The holder 51 then rocks around the bottom of the heel 57, cooperating with the bottom of the socket 45 and pushing the ratchet 49. The ratchet pivots around the shaft 48 to bring its end 50 into cooperation with the wheel R thus causing the blockage of the retractor as shown in FIG. 3.

If, starting from the condition shown in this figure, the acceleration or deceleration having caused the rocking of the holder diminishes until it is below that of the threshold value having caused the triggering of the device, the ball 60 returns into its non-operational condition by rolling along the frustroconical surface 54 to bring the holder-ball combination into the position in which the axes 55 and 46 of the holder and the socket are again aligned.

The embodiment of FIG. 4 is similar to that of FIG. 3 and the corresponding parts of the two embodiments have the same reference numerals. Yet, while in the embodiment of FIG. 3 described hereinabove the holder 51 is formed by a cylindrical sleeve snapped to the bottom having the heel 57, in the embodiment according to FIG. 4, sleeve 52 is blocked at its end spaced from that of attachment to the bottom 53 by a wall 65. The wall 65 is advantageously of one piece with the sleeve, i.e., a pot or cup having a curved bottom 65, is connected to the base 53. More precisely, the wall 65 is concave with respect to the ratchet 66 which has a protrusion 67 on its face closest to the wall 65.

In the condition of rest of the device, the protrusion 67 is in contact with the wall 65 and, as long as the device is not subjected to an acceleration or a deceleration of a value greater than the predetermined threshold value, or further that no tilting force acts on it, the axis 55 of the holder 51 is aligned with the axis 46 of the socket 45. The ratchet 66 is thus in a position in which its free end 69, spaced from the pivoting axis 48, does not cooperate with the teeth of the wheel R.

When, in contrast, an acceleration, a deceleration or a tilting greater than the threshold value occurs, the ball 60 is moved from its equilibrium position, causing the displacement of the center of gravity and the rocking of the holder around an edge of the heel 57 as described hereinabove. The wall 65, with which the protrusion 67 cooperates, thus controls the pivoting of the ratchet 66 in the direction shown by the arrow f and, as a result, causes the free end 69 of the ratchet to cooperate with the teeth of the wheel R to cause the locking of the retractor.

In this embodiment, the displacement of the ratchet 66 is the same, no matter what the direction of rocking of the holder 51, such that the quality of operation of the device is even further improved.

The drawings and specification present a detailed disclosure of a preferred embodiment of the invention. It is to be understood however that the invention is not limited to specific embodiments disclosed but covers instead all modifications, changes and alternative construction falling within the scope of the invention as defined by the claims.

I claim:

1. An inertia device for blocking the rotation of a shaft with a ratchet when said device is subjected to a destabilizing force, said device comprising:
   a pivoting ratchet;
   a gear means attached to the end of said shaft;
   means for activating said ratchet such that it coacts with the gear means to block movement of the gear means;
   said activating means comprising a holder containing an inertia mass; said inertia mass being arranged within said holder such that in the event the device is subjected to a destabilizing force, the holder is tilted by virtue of the displacement of the center of gravity of the holder-inertia mass combination and as a result, the pivotable ratchet is brought into engagement with said gear means by said holder.

2. The inertia device of claim 1, wherein said holder is rockably mounted in a container.

3. The inertia device of claim 2, wherein said holder is provided with a heel adapted so that it may be at least partially inserted within a socket located within the base of said container.

4. The inertia device of claim 3, wherein said heel and said socket are both in the form of truncated cones.

5. The inertia device of claim 2, wherein said inertia mass is free to move relative to said holder.

6. The inertia device of claim 2, wherein the inertia mass is a ball which rests on the interior surface of the base of said holder, and wherein said interior base is conical.

7. The inertia device of claim 6, wherein said holder is provided with a surface adapted to support said ratchet during normal operation, said holder further being adapted such that as a result of the rocking of the container the said surface of said container pivots said ratchet into locking engagement with said gear means.

8. The inertia device of claim 7, wherein during normal operation the upper surface of said holder is elevated above the upper edge of said container and said ratchet rests along an upper edge of said holder.

9. The device of claim 7, wherein said holder is covered on top by a cover and said ratchet is provided with a protrusion which in the absence of a destabilizing force is arranged to rest on said cover.

10. The device of claim 9, wherein said cover is concave and wherein during normal operation said protrusion is arranged to rest along the lower portion of said concave cover.

11. The inertia device of claim 9, wherein the bottom portion of said holder is snapped into engagement with said holder.

12. The inertia device according to claim 2, wherein said container is provided with pins for mounting said container on the frame of a seat belt retractor.

13. The inertia device according to claim 2, wherein said container is attached to a seat belt retractor and one end of a strap is attached to said shaft.

14. A seat belt retractor comprising:
    (a) a seat belt and a shaft, one end of said seat belt being attached to said shaft;
    (b) a gear means arranged to rotate together with said shaft;
    (c) a pivotable ratchet;
    (d) a container;
    (e) a holder located at least partially within said container;
    (f) an inertia mass;
    said inertia mass being located within said holder such that during normal operation said ratchet is supported by said holder while in the event said device is subjected to a destabilizing force, said holder is adapted to rock within said container so as to force said ratchet into engagement with said gear means.

* * * * *